(12) United States Patent
Nobbe

(10) Patent No.: US 8,434,261 B2
(45) Date of Patent: May 7, 2013

(54) PLANTING POT

(75) Inventor: Norbert Nobbe, Holdorf (DE)

(73) Assignee: Poppelmann Holding GmbH & Co. KG, Lohne (DE)

( * ) Notice: Subject to any disclaimer, the term of this patent is extended or adjusted under 35 U.S.C. 154(b) by 231 days.

(21) Appl. No.: 12/988,555

(22) PCT Filed: Jun. 3, 2009

(86) PCT No.: PCT/EP2009/003941
§ 371 (c)(1),
(2), (4) Date: Oct. 19, 2010

(87) PCT Pub. No.: WO2009/156048
PCT Pub. Date: Dec. 30, 2009

(65) Prior Publication Data
US 2011/0083365 A1    Apr. 14, 2011

(30) Foreign Application Priority Data
Jun. 24, 2008  (DE) ............... 20 2008 008 356 U

(51) Int. Cl.
*A01G 9/02* (2006.01)
(52) U.S. Cl.
USPC .......................................... 47/65.7
(58) Field of Classification Search ............ 47/65.5, 47/65.7; D11/152
See application file for complete search history.

(56) References Cited

U.S. PATENT DOCUMENTS

| 1,775,831 | A | * | 9/1930 | Salisbury | 47/65.5 |
| D243,112 | S | * | 1/1977 | Gross | D11/152 |
| 5,459,960 | A | * | 10/1995 | Manlove | 47/65.5 |
| 6,134,832 | A | * | 10/2000 | Bokmiller et al. | 47/66.1 |
| D483,690 | S | * | 12/2003 | Sieverding | D11/152 |
| D502,669 | S | * | 3/2005 | Smith et al. | D11/155 |
| D577,630 | S | * | 9/2008 | Schmidt | D11/152 |
| 7,624,535 | B2 | * | 12/2009 | Schmidt | 47/65.5 |
| 7,673,417 | B2 | * | 3/2010 | Smith et al. | 47/66.7 |
| 7,690,150 | B2 | * | 4/2010 | Orschulik | 47/66.1 |
| 2005/0005516 | A1 | | 1/2005 | Schmidt | |
| 2006/0037241 | A1 | | 2/2006 | Orschulik | |
| 2011/0083365 | A1 | * | 4/2011 | Nobbe | 47/65.7 |

FOREIGN PATENT DOCUMENTS

DE     20119165 U1     3/2003
DE     20210788 U1     11/2003

* cited by examiner

*Primary Examiner* — Frank T Palo
(74) *Attorney, Agent, or Firm* — Husch Blackwell LLP; Robert C. Haldman; Daniel S. Cohn

(57) ABSTRACT

The Invention relates to a planting pot made of plastic and having a bottom provided with holes, comprising in particular a multipart base region forming a first plane for setting the planting pot on a contact surface, wherein the base region is interrupted by at least one channel leading to the outside on the edge, wherein in an area adjoining the base region the planting pot comprises a hole, which is arranged at a distance from a channel for draining a bottom planting pot region.

19 Claims, 4 Drawing Sheets

PLANTING POT

FIELD OF THE INVENTION

The invention at issue concerns a plant pot made of plastic with a floor that is provided with holes that features, implementing a first plane, in particular a multi-piece stand area for the installation of the plant pot on a contact surface, wherein the stand area is interrupted by at least one channel that extends to the edge side.

BACKGROUND OF THE INVENTION

In professional horticulture a plurality of plant pots with plants have to be worked on simultaneously. The watering of the plant pots takes hereby place in particular by means of low tide\high tide watering or by means of irrigation from above. For the optimal watering and draining of the plant pots as well as for the optimal ventilation of the goods located within the plant pot in particular the floor of the plant pots is provided with a larger number of channels and holes through which an exchange of air and water between the material located in the interior of the plant pot and the exterior environment is assured. The exchange of water can in this case take place by means of a surge-like flow or by means of so-called capillary draining or watering. For both watering types there exist different hole shapes so that the floor geometry of a plant pot is correspondingly complex. The production of the floors or floor areas, which are provided with complex geometries, of the plant pots places significant demands on the tools of the plant pots that are manufactured in the die-casting- and deep-drawing process. Stamps for the mounting of the holes that transition from floor surfaces to channel side walls have to be implemented exactly aligned and lead in the case of imprecision to a high amount of waste during production.

It is therefore the object of the invention at issue to further improve a plant pot in such a manner that it satisfies on the one hand the requirements regarding watering and ventilation and is better suitable for manufacture, especially in regard to the die-casting process.

SUMMARY OF THE INVENTION

The problem is solved by means of a plant pot according to claim 1, advantageous improvements according to the invention can be deduced from the sub claims referenced thereto as well as the following description.

The plant pot according to the invention features in a surface that borders the stand area a hole that serves the drainage of the lowest plant pot area and is disposed in a spaced apart manner from a channel. The channel that serves the purpose of preferably a fast drainage and ventilation consequently has no connection with an edge or a side rim of the hole that is disposed in a lower area of the plant pot. It can therefore be implemented without regard to a particular geometry in a die-cast tool. At the same time the hole can also be created by simple means through stamping, for example of a deeply-drawn plant pot.

In contrast to holes that are exclusively disposed in the plane of the stand area, this one is disposed for the purpose of drainage of a lowest plant pot area at least partially out of this plane in an upward direction. Drainage through the hole can therefore take place. The hollowed-out region implemented by the hole is preferably not enclosed for that purpose but connected with other hollowed-out regions, especially without the rim of the hole featuring a connection to an edge of a channel wall. Preferably the surface featuring the hole can be a circular segment-shaped surface around a central hollowed-out region of a plant pot. The hole without connection to a channel is located in a surface that borders the stand area and can be implemented for example curved/rounded or also as a kinked-off plane. The hole is however not in direct connection with a side wall that does not implement a channel.

In order to assure a drainage of the lowest, interior plant pot area, which most often features a vertical extent of a few millimeters, the lower edge of the hole is removed from the lowest interior location of the plant pot to the extent that a capillary drainage through the hole into the surrounding of the plant pot or into the hollowed-out areas can be assured. Depending on the utilized material for the filling of the plant pot the spacing considered here is less than 5 mm, preferably less than 3 mm and particularly preferred less than 1.5 mm.

Preferably the hole is adjusted in reference to the first plane at least partially oblique so that a transition of the hole from a lower plane to a curved plane is possible and can take place without obstruction during the installation of the pot on a fleece mat.

The hole and the surface that are present around the hole are located preferably on the side, in the direction facing a central longitudinal middle axis, of a line from the longitudinal middle axis to the stand area, wherein the surface lines up in a particularly preferred manner toward a central longitudinal middle axis. In so doing the stand area runs on the edge side of the floor or floor area which assures a particularly firm stand of the plant pot.

The surface surrounding the hole can be implemented curved. Preferably the surface is however implemented as a plane which is simpler to handle from a manufacturing technology point of view. Such a plane, in an advantageous improvement of the invention, is disposed between the first and an additional plane that implements an essential side wall of a central hollowed-out area. The plant pot according to the invention is therefore provided with a plurality of different planes, whereby a different number of drainage and watering issues can be optimized.

It is understood that such a plane that features a hole without connection to a channel can be present several times along the circumference of the plant pot. In case of a dome, within the plant pot, that features for example for side walls a plane for the implementation of the plant pot according to the invention can be disposed respectively between the outer rim edges or stand areas. The surface or plane is then interrupted for example by channels that are implemented for quick drainage.

Such a plane is furthermore advantageously provided with at least two holes, which are not connected to a channel, between which a flat channel featuring a further hole for slow drainage is provided. Such an additional channel requires admittedly an additional construction effort, can however be manufactured comparatively simply because of its essentially or completely horizontally running cover layer. At the same time it supports the capillary drainage of the lower pot areas which in turn benefits the drainage of the lowest planted pot areas.

The stand area of the plant pot is preferably implemented without installation feet so that the forces acting on the floor can be received across a large surface and no troughs or other undesired floor elevations form in the lowest plant pot area that would make its drainage more difficult.

Particularly preferred the stand area is furthermore implemented along with a bar, which projects into the channel that, for improved stackability, is preferably implemented curved to the inside and offset from the edge area. The installation surface is thereby enlarged without that passage of water and air through the channel that is implemented on the edge side would be impeded. Furthermore the ripping of plant bags is hereby effectively prevented.

BRIEF DESCRIPTION OF THE DRAWING

Further advantages and embodiments of the invention can be deduced from the following description of the figures. In the schematic representations it is shown.

DETAILED DESCRIPTION OF PREFERRED EMBODIMENTS

The same of similarly effective parts are—if useful—provided with identical reference numbers. Individual technical characteristics of the following described embodiments examples can, with the characteristics of the previously described embodiment examples, lead to further improvements according to the invention.

Figure 1:
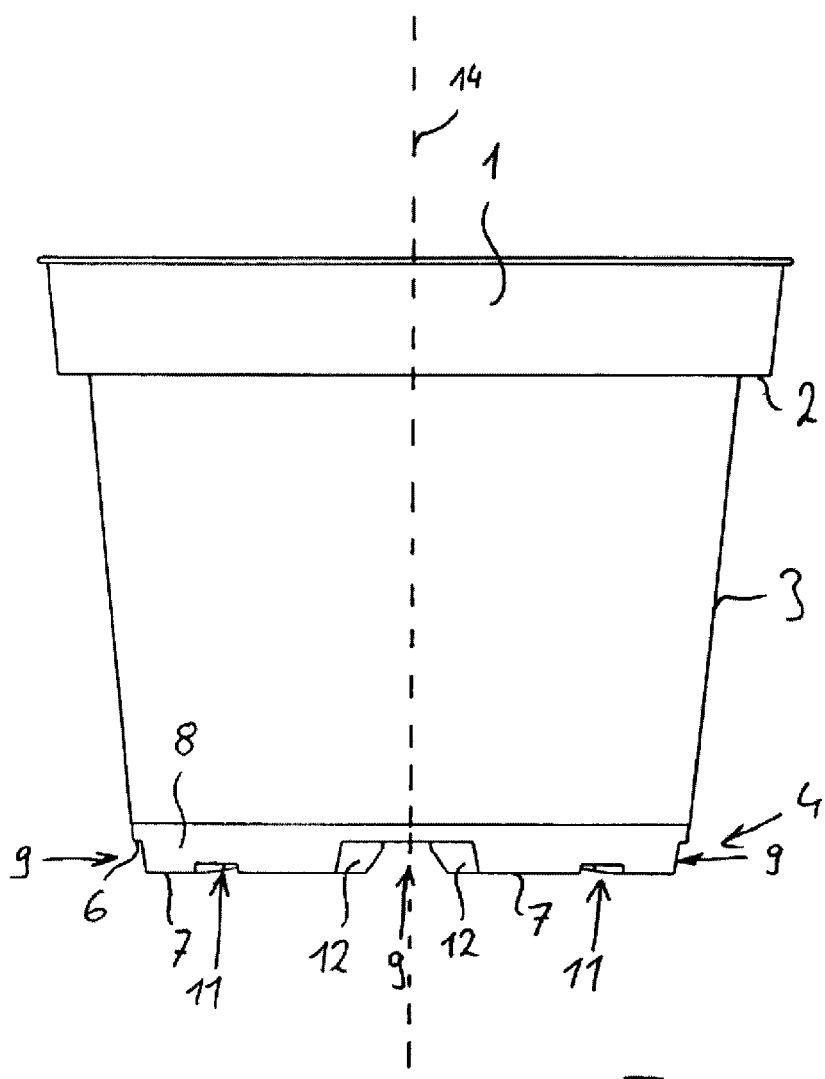
FIG. 1 an object according to the invention in a side view

The plant pot according to the invention according to FIG. 1 encompasses an upper edge 1 that is connected by means of a projection 2 with the slightly obliquely adjusted plant pot side wall 3.

In the floor area 4 channels 9, on the left and right side of the plant pot in the figure, are identified that run across a projection 6 at right angles to a further channel 9. The floor area 4 features furthermore a lower edge 7 that is part of the stand area for the installation of the plant pot on a contact surface that is not represented. A slightly inclined, essentially vertical side wall 8 of the floor area 4 is interrupted by one of the channels 9, which extends to the edge side for the purpose of quick drainage, as well as by two smaller flat channels 11 by means of which a capillary drainage of the interior area, which in the plant pot is located in the lower area, can take place.

The central channel 9 is slightly narrowed by means of slightly recessed bars 12, which among other things provide an improved stackability.

Figure 2:
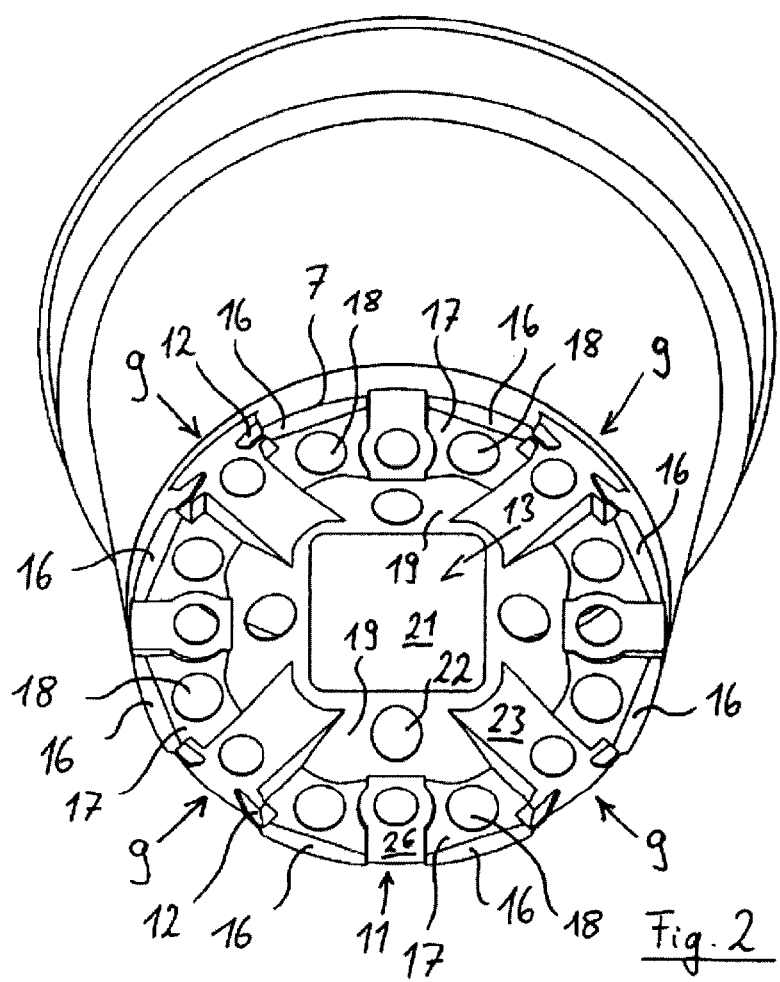
FIG. 2 an object according to the invention in a perspective view from obliquely below, FIG. 3 the object according to FIG. 1 in lower view FIG. 4 the object according to FIG. 3 along the cut A-A, FIG. 5 the object according to FIG. 3 along the cut B-B, FIG. 6 the object according to FIG. 3 along the cut C-C.
Figure 3:
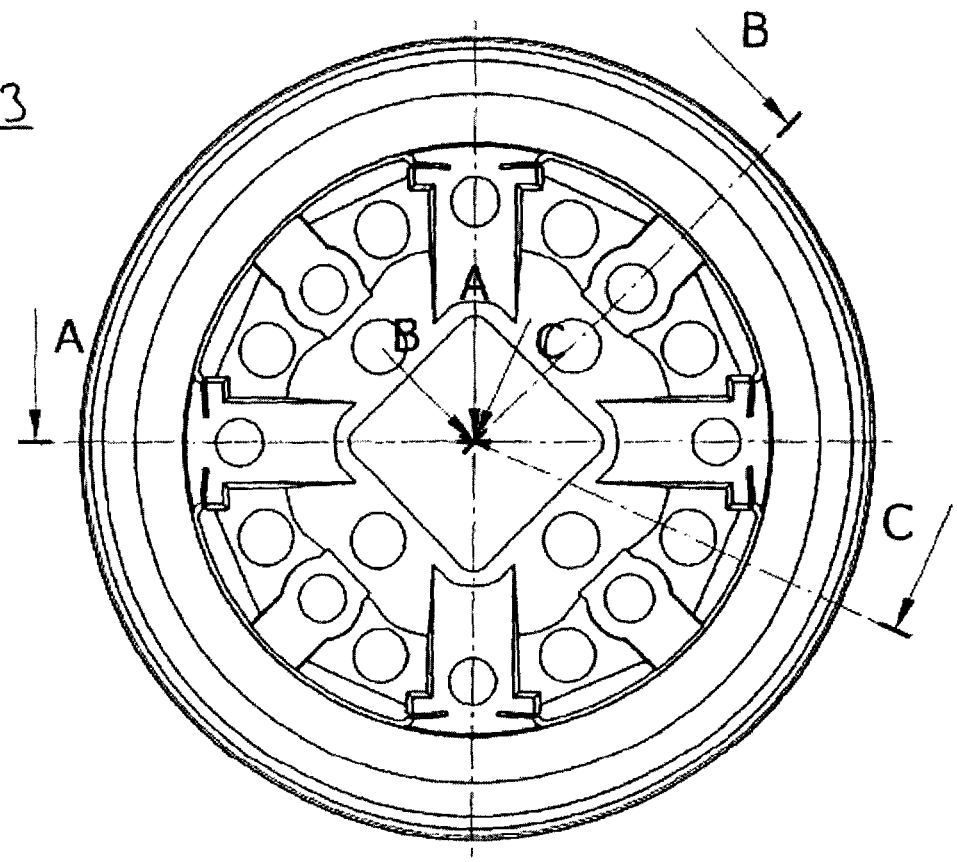

In the perspective view of the underside of the plant pot of FIG. 2 it can be recognized that the floor area 4 is implemented entirely symmetrically in regard to the longitudinal middle axis 14 (compare FIG. 1). Altogether four cross-shaped disposed channels 9 are present that end in a central hollowed-out area 13 that is disposed in its approximately square implementation around the longitudinal middle axis 14.

Further in the direction of the longitudinal middle axis 14 follows, from surface 17 in a kinked manner, a significantly steeper implemented surface 19 that implements as side walls the dome that features a cupola surface 21. In the surface 19 also are drainage holes 22 provided for the drainage above the lower and the lowest plant pot area.

Further in the direction of the longitudinal middle axis 14 follows, from surface 16 in a kinked manner, a significantly steeper implemented surface 19 that implements as side walls the dome that features a cupola surface 21. In the surface 19 also are drainage holes 22 provided for the drainage above the lower and the lowest plant pot area.

The surfaces 17 that border the stand areas 16 are divided by the flat channels 11 that border against the side wall 19 approximately on the same height together with the surface 17.

Together with the cover surfaces 23, which implement a further drainage plane, of the channels 9 the plant pot according to the invention features in the represented embodiment four drainage or ventilation planes. It is thereby adaptable to a plurality of different watering and ventilation situations and suitable for the application during a low tide/high tide watering as well as also for irrigation from above.

Figure 4:
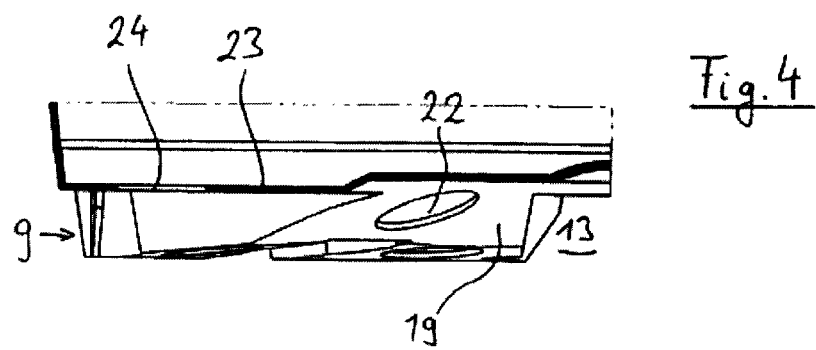
Figure 5:
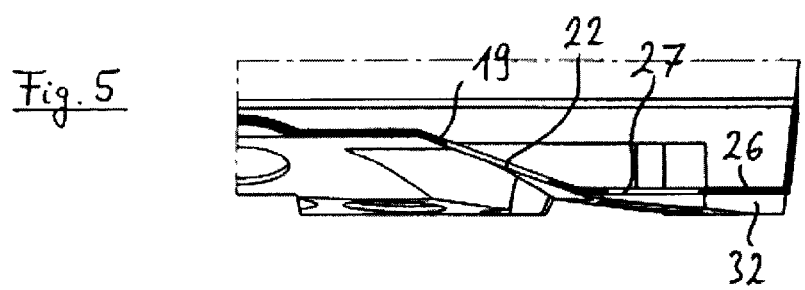
Figure 6:
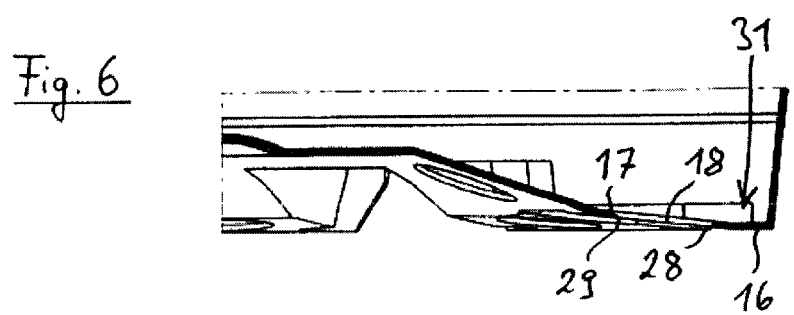

The plurality of drainage/watering and ventilation holes in the respective planes can be deduced particularly well from a comparison of the FIGS. 4 to 6. The channels 9 that serve the purpose of quick drainage feature in their cover areas 23 holes 24 and form a first drainage plane. The next drainage plane is formed by means of the side walls 19 and the holes 22 located therein. The flat channel 11 with its cover area 26 is preferably suited for the capillary drainage by means of the holes 27. The same applies to the holes 18, which protrude into the stand area, of the planes 17 that border the stand area 16. The surfaces 17 are preferably angled in an range of up to 10°, in particular 6°, relative to the stand area 16 and extend up to the height of 1 mm to 2 mm above the plane formed by the stand area 16. The holes 17 themselves reach preferably to the floor area or into the stand area 16 and are with their outer hole edge 28 on a lower level than with their inner hole edge 29. The level difference amounts preferably to less than 1 mm so that a slow drainage of the lowest floor area 31 is realizable. The lowest floor area 31 can furthermore be defined by means of the vertical extent of the side wall 32 of the flat channel 11 (compare FIG. 5). In the represented embodiment example the height of this area is about 1.5 mm.

The invention claimed is:

1. A plant pot made of plastic comprising: a floor that is provided with holes which forms a first plane with a multi-piece stand area for the installation of the plant pot on a contact surface, wherein the stand area is interrupted by at least one channel that extends to an edge side of the floor; a surface that borders the stand area and has a hole that serves as drainage of a lowest plant pot area and is disposed in a spaced apart manner from the channel.

2. The plant pot according to claim 1, wherein the hole is adjusted in reference to the first plane at least partially oblique.

3. The plant pot according to claim 2, wherein the surface slopes up toward a central longitudinal middle axis.

4. The plant pot according to claim 3 wherein two of the holes are provided in the surface and which are not connected to the channel, a flat channel featuring a further hole for slow drainage is provided between the two holes, and the two holes are each disposed in a spaced apart manner from the flat channel.

5. The plant pot according to claim 4 wherein the plane is disposed between the first and an additional plane that implements an essential side wall of a central hollowed-out area.

6. The plant pot according to claim 4 wherein two of the holes are provided in the surface and which are not connected to the channel, and a flat channel featuring a further hole for slow drainage is provided between the two holes, and the two holes are each disposed in a spaced apart manner from the flat channel.

7. The plant pot according to claim 3 wherein two of the holes are provided in the surface and which are not connected to the channel, and a flat channel featuring a further hole for slow drainage is provided between the two holes, and the two holes are each disposed in a spaced apart manner from the flat channel.

8. The plant pot according to claim 2 wherein two of the holes are provided in the surface and which are not connected to the channel, and a flat channel featuring a further hole for slow drainage is provided between the two holes, and the two holes are each disposed in a spaced apart manner from the flat channel.

9. The plant pot according to claim 1, wherein the stand area runs on an edge side of the floor.

10. The plant pot according to claim 9, wherein the surface forms a plane.

11. The plant pot according to claim 10, wherein the plant pot is implemented without installation feet.

12. The plant pot according to claim 11 wherein two of the holes are provided in the surface and which are not connected to the channel, and a flat channel featuring a further hole for slow drainage is provided between the two holes, and the two holes are each disposed in a spaced apart manner from the flat channel.

13. The plant pot according to claim 10 wherein two of the holes are provided in the surface and which are not connected to the channel, and a flat channel featuring a further hole for slow drainage is provided between the two holes, and the two holes are each disposed in a spaced apart manner from the flat channel.

14. The plant pot according to claim 9 wherein two of the holes are provided in the surface and which are not connected to the channel, and a flat channel featuring a further hole for slow drainage is provided between the two holes, and the two holes are each disposed in a spaced apart manner from the flat channel.

15. The plant pot according to claim 1, wherein the plane is disposed between the first and an additional plane that implements an essential side wall of a central hollowed-out area.

16. The plant pot according to claim 15, wherein the stand area is implemented by means of a bar that protrudes into the channel.

17. The plant pot according to claim 1 wherein two of the holes are provided in the surface and which are not connected to the channel, and a flat channel featuring a further hole for slow drainage is provided between the two holes, and the two holes are each disposed in a spaced apart manner from the flat channel.

18. The plant pot according claim 1, wherein the plant pot is implemented without installation feet.

19. The plant pot according to claim 1, wherein the stand area is implemented by means of a bar that protrudes into the channel.

* * * * *

UNITED STATES PATENT AND TRADEMARK OFFICE
CERTIFICATE OF CORRECTION

PATENT NO. : 8,434,261 B2 Page 1 of 1
APPLICATION NO. : 12/988555
DATED : May 7, 2013
INVENTOR(S) : Norbert Nobbe It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 228 days.

Signed and Sealed this
Eighth Day of September, 2015

Michelle K. Lee
*Director of the United States Patent and Trademark Office*